United States Patent [19]

Smadja et al.

[11] 4,007,127
[45] Feb. 8, 1977

[54] BITUMINOUS CATIONIC EMULSION

[75] Inventors: Rene Smadja; Louis Houizot, both of Notre Dame de Gravenchon, France

[73] Assignee: Mobil Oil Corporation, New York, N.Y.

[22] Filed: Jan. 16, 1975

[21] Appl. No.: 541,533

[52] U.S. Cl. .......................... 252/311.5; 252/314; 106/277
[51] Int. Cl.² .................................. B01J 13/00
[58] Field of Search .............. 252/311.5, 314; 106/277

[56] References Cited

UNITED STATES PATENTS

| 3,108,971 | 10/1963 | Mertens | 252/311.5 |
|---|---|---|---|
| 3,340,203 | 9/1967 | Ferm | 252/311.5 |
| 3,434,856 | 3/1969 | Goldstein | 106/277 |
| 3,728,278 | 4/1973 | Tramelli | 252/311.5 |
| 3,859,227 | 1/1975 | Dwyer | 252/311.5 |

*Primary Examiner*—Richard D. Lovering
*Assistant Examiner*—E. Suzanne Parr
*Attorney, Agent, or Firm*—Charles A. Huggett; Raymond W. Barclay; Dennis P. Santini

[57] ABSTRACT

The novel cationic emulsions of this invention contain 50 to 75% by weight in water of bitumen, such as asphalt, coal tar and the like or a mixture of different bitumens, and emulsifying system preferably consisting of an N-hydrocarbyl alkylene diamine and a mineral acid, especially hydrochloric acid, and a second amine capable of reacting with the acidic anions present in the water phase, the pH of the emulsion ranging from 1 to 7. The emulsions have utility as binders, paving materials and coating materials, either used alone or combined with granulates. Preparation of these cationic emulsions of controlled pH and improved adhesion to conventional granulates are also disclosed.

7 Claims, No Drawings

BITUMINOUS CATIONIC EMULSION

BACKGROUND OF THE INVENTION

1. Field of the Invention

The present invention concerns a procedure for controlling the pH of cationic emulsions of bituminous type binders; it also relates to new cationic emulsions obtained from the said binders.

2. Prior Art of the Invention

U.S. Pat. No. 3,240,716 discloses asphalt emulsions, containing lithium hydroxide, of 2% inherent acidity and 60% demulsifiable. U.S. Pat. No. 3,422,026 discloses paving emulsions containing 50 to 75% asphalt and as emulsifier quaternary ammonium salts from $C_{14}$ to $C_{18}$ fatty amines or their ethoxylated derivatives and sodium amino- or iminoproprionate. U.S. Pat. No. 3,340,203 discloses bituminous emulsions prepared from bitumen and, as emulsifer, an N-hydrocarbyl alkylene polyamine and hydroxylecithin. U.S. Pat. No. 3,389,090 discloses asphalt emulsions consisting of asphalt and as the emulsifier N-alkyl-1, 3-propanediamines, such as sec-hexadecyl-1, 3-propanediamine, and octylphenoxy poly(ethyleneoxy) ethanol.

SUMMARY OF THE INVENTION

The present invention concerns cationic binder emulsions having a pH of from 1 to 7 and containing in the water phase at least one organic compound having at least one amine function. The invention is based on the discovery that when a water-soluble organic compound, having less than 10 carbon atoms and which has at least one amine function capable of reacting with the acidic anions present in the water phase to produce an ionic amine salt, is added to the water phase of a bituminious cationic emulsion before the emulsion is formed, it is possible to obtain emulsions having excellent binder properties.

DESCRIPTION OF SPECIFIC EMBODIMENTS

In this invention, the term "binder" means all products essentially composed of bitumen, such as asphalt, coal tar, or a mixture of asphalt and coal tar, which are used, for example, to construct or repair road pavements, airport runways or the like, or provide various types of coatings. These binders may also contain a number of additives which modify their properties. Such additives include synthetic or natural rubbers or thermoplastic or thermosetting resins, such as polybutylenes, butadiene-styrene rubbers (GRS), vinyl polymers and the like.

Cationic bitumen emulsions are of the oil-in-water type; they consist of a suspension of bituminous particles in the water phase. These particles, which represent around 50 to 75% by weight of the emulsion, have, in the case of cationic emulsions, a positive charge.

The cationic emulsions are obtained by vigorously stirring a mixture of water, bitumen and emulsifying agent, which is produced from a polyamine and a water soluble acid. It is the salt resulting from the action of the said polyamine on the said acid that constitutes the emulsifying agent. The cation of this salt is located on the periphery of the bitumen particles because of the affinity of the polyamine used for the said bitumen, and the anion of this salt remains in the water phase in the form of negatively charged ions. Thus when an amine and hydrochloric acid are used as an emulsifying system, they form an ($-NH_3^+$) cation and a $Cl^-$ anion which remain in the water phase. Taking into account this reaction of salt formation, it is advisable, in order to obtain maximum cations, to use an appreciable stoichiometric excess of acid with respect to the quantity of amine. This excess acid increases the storage stability of the emulsion. However, excess acid causes the emulsion to have a very acidic pH. If the pH is permitted to remain at 1 or below when the emulsion is finally used, various problems may result. For instance, the adhesiveness of a paving emulsion to acidic granulate solids, conventionally used as paving materials, such as flints or quartz, may be reduced or undesirable chemical reactions with calcareous granulates may occur. Although such emulsions can be used as a paving material, it is preferred that the pH be over 1.

Accordingly, a water soluble organic compound having an amine function and less than 10 carbon atoms is added to the water dispersion which will be the aqueous phase of the stable bitumen cationic emulsion before manufacturing the emulsion in sufficient amount to provide a pH of from 1 to 7.

The organic compound is added to the water phase of the emulsion by the following method. It is possible, for example, to add the said organic compound in its own water solution or neat to the water mixture containing the acid-polyamine emulsifying agent prior to mixing with the bitumen, and then produce the bitumen emulsion in the water mixture so obtained. The control of the emulsion pH by the presence of the water-soluble compound provides an excellent means of preparing improved bituminous emulsions. A more detailed discussion of the process will be made hereinafter.

Amines suitable in producing emulsifying agents used in this invention are the alkylene polyamines having 2 to 10 nitrogen atoms and from 1 to 30 carbon atoms. Since this emulsifier agent should have at least some solubility in the bitumen phase, it should have sufficient carbon atoms to provide such solubility. Most preferred emulsifying agents are the N-hydrocarbyl diamines having the formula

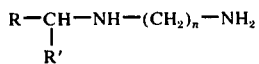

wherein the R and R' groups may individually be hydrogen, alkyl, aryl, alkaryl, or aralkyl, at least one of R or R' being an organic group and the total N-hydrocarbyl carbon content preferably being from 4 to 30, and $n$ is 1 to 5. Preferably, of R and R', one is hydrogen and the other is alkyl of from about 10 to 20 carbon atoms and $n$ is 3, or N-$C_{10}$-$C_{20}$-alkyl-1,3-propanediamine. Commercial diamines available are those in which the N-substituents are $C_{16}$ to $C_{18}$ alkyl.

As the water soluble acid, any mineral acid may be used, although the hydrochloric acid is preferred. In addition to hydrochloric acid mentioned above, acetic or lactic acid provides a satisfactory co-agent. Nitric and sulfuric may be used, but are less preferred.

Different types of organic compounds can be used, according to the invention; all of them have at least one amine function and sufficient water solubility to avoid precipitation of the organic compound in case hydrolysis of the amine hydrochloride resulting from the reaction of the said organic compound with the acidic ions remaining in the water phase of the emulsion should occur. This amine hydrochloride must be water soluble, and present in the water phase in an ionic state, in order that the concentration of the excess acid ions may remain constant in the water phase. But the presence of this organic compound decreases the acidity of the water phase, thereby bringing the final pH to 1 to 7. The quantity of organic compound to be used depends on the alkalinity of the said organic compound, and on the pH desired for the emulsion.

The water soluble organic compounds useful in this invention include aliphatic monoamines having from 1 to about 9 carbon atoms, cycloalkyl amines, such as cyclohexylamine, aromatic amines of the formula

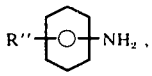

such as aniline, aminophenol, aniline sulfonic acid, toluidine, and the like, wherein $R''$ is another hydrogen atom of the benzene ring or alkyl of 1 to 3 carbon atoms or a sulfonate or hydroxy group, alkylene polyamines of the formula $H_2N(C_mH_{2m}NH)_r-H$, wherein $m$ is 1 to 3 and $r$ is 1 to 3, such as ethylenediamine, diethylenetriamine and triethylenetetramine. Most preferred are alkanol amines of the formula

wherein $m$ and $s$ are 1 to 3. Such amines are monoethanolamine, diethanolamine, triethanolamine, and mono-, di- and tripropanolamine or isopropanolamine are suitable in this invention. Monoethanolamine is most preferred of these because of its strong alkalinity.

The process of this invention provides the following advantages when using the preferred hydrochloric acid in the emulsifying system:

a. It conserves at a constant level the excess of the chloride anion ($Cl^-$) in the water phase, and permits obtaining good storage stability of the emulsion by means of an initial acid excess, while having a high final emulsion pH;

b. Utilization of a water soluble amine avoids the precipitation of this amine, which can result from the hydrolysis of the amine hydrochloride formed if the alkaline properties of the amine are weak. In fact this precipitation can increase the viscosity of the emulsion, and favour the sedimentation of the globules of bitumen;

c. The amine hydrochloride thus formed decreases the surface tension of the water phase of the emulsion (contrary to the metallic chlorides which increase it), which enables a higher pH emulsion to be obtained without stability problems;

d. Owing to the precision of the curve of neutralization of the water soluble amine by hydrochloric acid, the pH of the emulsion is easily controllable within the interval of 1 to 7, and the procedure developed permits the emulsion pH to be adjusted to the desired level within the above stated limits. The possibility of using a very diluted amine solution increases the precision of controlling the desired results;

e. It is possible, by adjusting the pH of the cationic emulsion, to control two major properties of these emulsions: their breaking speed on granulate (a speed which increases when the pH of the emulsion is increased), and their properties of adhesion to granulates (an adhesiveness which increases as the pH increases).

Preparation of the emulsions may be carried out by conventional practices. Usually, the water phase is first prepared by adding to the emulsifying system the bitumen-soluble polyamine, e.g. the N-hydrocarbyl alkylenediamine, and mineral acid, e.g. hydrochloric acid, to the water. The resulting aqueous dispersion is then mixed with the bitumen in any suitable vessel capable of vigorous agitation, such as a colloid mill. The bitumen may be heated prior to the mixing to 200° to 350° F. The water phase temperatures may range from 70° to 205° F., preferably 80° to 185° F. The water dispersion and the bitumen, such as asphalt, are vigorously mixed to produce the bituminous emulsion. The concentration of emulsifying amine is from 0.005% to about 5% by weight of total emulsion. The acid may be at any concentration to provide the desired acidity, preferably from 1 to below 4.

The water soluble amine must be added to the water dispersion prior to being combined with the bitumen. The concentration of this amine may range from 0.001% to 1% by weight of total emulsion. However, this is a preferred limitation; the pH range desired of 1 to 7 controls the amount of this second amine to be added.

The bitumen useful in this invention may be obtained from petroleum refining process, such as straight run or airblown asphalts. Asphalts having a penetration of from 0 to 300 (ASTM D5) are suitable in this invention.

The final emulsions may be used alone as coatings or combined with solid granular materials for use in paving or road-repairing operations. The aggregates used with the emulsions of this invention include quartz, limestone, flint, granite, sand of any convenient size. Gravel or even more finely crushed rock may be used. Control of adhesiveness evidenced by the process of this invention has been found applicable to many commonly used aggregates for paving emulsions. The presence of natural and synthetic rubbers, polybutylenes, polypropylenes, polyvinyl chloride and acetates provide additional characteristics when combined with the bitumen prior to emulsification. Day-to-day exposure to changing weather conditions may make the use of such additional extenders more advantageous, although, they are not essential.

The following examples will illustrate the novel emulsions of this invention and the manner of preparing them. The term "MT" stands for metric ton.

EXAMPLE 1

A 2-kg batch of cationic bituminous emulsion for use in road surface dressing was prepared by vigorously agitating in a colloid mill a mixture composed of 60% by weight of bitumen (asphalt 180/220) and 40% by weight of a water dispersion which contained a mixture of 1.5 kg/MT of final emulsion of a polyamine having the formula:

in which R represents an aliphatic chain having between 16 and 18 carbon atoms and 2.2 kg/MT of final emulsion of hydrochloric acid at 22° B.

Before preparing the emulsion, various quantities of monoethanolamine were added to the water dispersion phase. The properties of the cationic emulsions obtained are listed in Table 1.

EXAMPLE 2

A 2-kg batch of cationic bituminous emulsion for use as a coating emulsion was obtained by vigorously agitating as in Example 1 a blend of 60% by weight of bitumen and 40% by weight of a water dispersion which contained various quantities of monoethanolamine, 2 kg/MT of the polyamine of Example 1 and 1.4 kg/MT of hydrochloric acid at 22° B.

The properties of the cationic emulsions obtained are given in Table 2.

EXAMPLE 3

A cationic bituminous emulsion was made by vigorously agitating a mixture composed of 60% by weight of bitumen and 40% by weight of a water dispersion which contained 1.4 kg/MT of the polyamine of Example 1 and 1 kg/MT of hydrochloric acid at 22° B. Before the emulsion was prepared, various quantities of monoethanolamine were added to the water dispersion phase.

The properties of the cationic emulsions thus obtained are given in Table 3.

EXAMPLE 4

A cationic bituminous emulsion was made by vigorously agitating a mixture composed of 60% by weight of bitumen and 40% by weight of a water dispersion containing X kg/MT of the polyamine of Example 1, and Y kg/MT 22° B of hydrochloric acid. Before the emulsion was produced, various amounts of different water-soluble amines were added to samples of the water dispersion phase.

The properties of the cationic emulsions obtained are given in Table 4.

The emulsions prepared by the examples in this invention have been evaluated by the following measurements:

1. Engler viscosity at 20° C. This known viscosity measurement is made, either after 24 hours storage of the emulsion at 20° C, or after 24 hours storage of the emulsion at 60° C.

2. Storage stability. This measurement consists of placing the emulsion in a test tube, and evaluating, after a given time, the thickness of the surface layer (decantation) and the bottom layer (deposit).

3. Average Particle Size of Emulsion. This is by direct measurement by means of a special particle size counter.

4. Emulsion Breaking Time. General property measured by breaking the emulsion brought into contact with a special filtering paper.

5. Emulsion Adhesiveness. Specific property directly measured by mixing reference aggregate with emulsion until emulsion breakup. The adhesion of bitumen particles on various granulates is expressed as the percentage of the bitumen remaining on the granulate after the breaking of the emulsion and the washing of the granulates with water.

Adhesion of bitumen particles on granulates is very important in the subsequent use of the emulsions as binders in paving materials. A high degree of adhesion indicates a more effective binder. Speed of emulsion breaking is also an important characteristic in road surface dressing utility. Thus, the higher the adhesiveness and the faster the breaking time, the more advantageous the emulsion for this application.

The results of these measurements on the emulsion of the examples are tabulated as follows:

TABLE 1

| Quantity of monoethanolamine (kg/MT emulsion) | 0 | 0.9 | 1 |
|---|---|---|---|
| Properties | | | |
| (1) pH | 1.8 | 5 | 6.9 |
| (2) Engler Viscosity at 20° C. | | | |
| after 24 hours storage | 3.1 | 3.9 | 4.2 |
| after 24 hours storage at 60° C. | 4.4 | 3.9 | 5.2 |
| (3) Storage Stability (% by volume) | | | |
| %Decantation at 20° C after 7 days | 3 | 3 | 2 |
| %Decantation at 60° C after 7 days | 1 | 1 | 1 |
| %Deposit at 20° C after 7 days | 6 | 6 | 5 |
| %Deposit at 60° C after 7 days | 6 | 6 | 6 |
| (4) Average particle size of the emulsion (microns) | 5.8 | 4.4 | 5.2 |
| (5) Emulsion breaking time (in seconds) | 55 | 25 | 23 |
| (6) Emulsion adhesiveness on various granulates | | | |
| Quartz | 10 | 11 | 31 |
| Flint | 55 | 53 | 57 |
| Limestone | 26 | 51 | 52 |
| (7) Breaking time of emulsion on various granulates (in seconds) | | | |
| Quartz | >300 | 130 | 25 |
| Flint | 90 | 35 | 10 |
| Limestone | 32 | 15 | 10 |

TABLE 2

| Quantity of monoethanolamine (kg/MT emulsion) | 0 | 0.2 | 0.3 | 0.4 | 0.5 |
|---|---|---|---|---|---|
| Properties | | | | | |
| (1) pH | 2.9 | 4 | 5 | 5.5 | 6.7 |
| (2) Engler Viscosity at 20° C. | | | | | |
| after storage for 24 hours | 4.2 | 4.3 | 4.7 | 4.3 | 4.3 |
| after 24 hours storage at 60° C. | 5.1 | 5.2 | 5.3 | 4.5 | 4.1 |
| (3) Storage Stability (% volume) | | | | | |
| % Decantation at 20° C. after 7 days | 2 | 1 | 1 | 2 | 2 |
| % Decantation at 60° C. after 7 days | 2 | 1 | 1 | 2 | 2 |
| % Deposit at 20° C. after 7 days | 4 | 2 | 4 | 6 | 6 |
| % Deposit at 60° C. after 7 days | 4 | 3 | 4 | 7 | 6 |
| (4) Average particle size of the emulsion (microns) | 5.9 | 6.3 | 6.6 | 6.2 | 6.2 |
| (5) Emulsion breaking time (in seconds) | 53 | 37 | 38 | 38 | 36 |
| (6) Emulsion adhesiveness on various granulates | | | | | |
| Quartz | 3 | 13 | 10 | 7 | 10 |
| Flint | 48 | 61 | 77 | 80 | 78 |
| Limestone | 26 | 33 | 33 | 67 | 48 |

TABLE 3

| Quantity of monoethanolamine (kg/MT emulsion) | 0 | 0.2 | 0.3 | 0.4 |
|---|---|---|---|---|
| Properties | | | | |
| (1) pH | 2.8 | 4.6 | 6 | 6.6 |
| (2) Engler Viscosity at 20° C. | | | | |
| after storage for 24 hours | 3.6 | 4.3 | 3.7 | 3.8 |
| after 24 hours storage at 60° C. | 5.6 | 5.2 | 4.2 | — |
| (3) Storage Stability (% volume) | | | | |
| % Decantation at 20° C. after 7 days | 3 | 1 | 2 | 3 |
| % Decantation at 60° C. after 7 days | 2 | 1 | 4 | 3 |
| % Deposit at 20° C. after 7 days | 9 | 3 | 6 | 6 |
| % Deposit at 60° C. after 7 days | 9 | 3 | 9 | 5 |
| (4) Average particle size of the emulsion (microns) | 6.4 | — | 6.1 | — |
| (5) Emulsion breaking time (in seconds) | 35 | 27 | 22 | 19 |
| (6) Emulsion adhesiveness on various granulates | | | | |
| Quartz | 13 | 10 | 18 | 20 |
| Flint | 52 | 42 | 68 | 100 |
| Limestone | 63 | 73 | 81 | 100 |

TABLE 4

| Quantity X of Polyamine (kg/Mt) | 1.5 | 2 | 2 | 2 | 1.5 | 1.5 |
|---|---|---|---|---|---|---|
| Quantity Y of hydrochloric acid at 22° B (kg/Mt) | 1.4 | 1 | 1 | 1 | 2.2 | 2.2 |
| Amine Used* | DETA | MEA | DEA | TEA | To | An |
| Quantity (kg/MT) | 0.38 | 0.05 | 0.1 | 0.15 | 1.6 | 1.4 |
| Properties of the emulsion | | | | | | |
| (1) pH | 6.5 | 5.8 | 6.9 | 6.0 | 4.4 | 4.6 |
| (2) Engler Viscosity at 20° C. | 3.4 | 5.6 | 5.5 | 4.9 | 4.5 | 4.6 |
| (3) Breaking time (in seconds) | 20 | 33 | 34 | 47 | 30 | 26 |
| (4) Storage Stability | | | | | | |
| % Decantation at 20° C. after 7 days | 2 | 2 | 1 | 2 | 2 | 2 |
| % Decantation at 60° C. after 7 days | 2 | 2 | 1 | 2 | 4 | 5 |
| % Deposit at 20° C. after 7 days | 5 | 4 | 2 | 4 | 1 | 1 |
| % Deposit at 60° C. after 7 days | 5 | 4 | 2 | 3 | 2 | 3 |

*
DETA : diethylenetriamine
MEA : monoethanolamine
DEA : diethanolamine
TEA : triethanolamine
To : toluidine
An : aniline Having described the invention, we claim:

1. A bituminous cationic emulsion useful as a binder which comprises (1) from about 50 to about 75 percent by weight of said emulsion of a bitumen, (2) water, (3) a mineral acid, (4) from about 0.005 to about 5 percent by weight of said emulsion of a bitumen soluble N-hydrocarbyl diamine having the formula $$R-\underset{R'}{\underset{|}{CH}}-NH-(CH_2)_n-NH_2$$

wherein R is hydrogen, alkyl, aryl or aralkyl, R' is alkyl, aryl or aralkyl, the total carbon content of R and R' being from 4 to 30 carbon atoms and $n$ being from 1 to 5, and (5) in amount sufficient to maintain the pH of said emulsion at from 1 to 7, a water soluble amine selected from the group consisting of aliphatic monoamine having from 1 to 9 carbon atoms, alkylene polyamine of the formula $H_2N(C_mH_{2m}NH)_r-H$, wherein M is 1 to 3 and $r$ is 1 to 3; and an aromatic amine of the formula

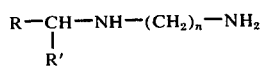

wherein R'' is hydrogen or alkyl of 1 to 3 carbon atoms.

2. The emulsion of claim 1 wherein said alkylene triamine is diethylene polyamine.
3. The emulsion of claim 1 wherein said alkylene polyamine is triethylene tetramine.
4. The emulsion of claim 1 wherein $n$ is 3 and R is hydrogen and R' is alkyl of 10 to 20 carbon atoms.
5. The emulsion of claim 4 wherein the R' group is alkyl of from 16 to 18 carbon atoms.
6. The emulsion of claim 1 wherein R'' is selected from the group consisting of hydrogen and methyl.
7. The emulsion of claim 1 wherein the mineral acid is hydrochloric acid.

* * * * *

UNITED STATES PATENT AND TRADEMARK OFFICE
CERTIFICATE OF CORRECTION

PATENT NO. : 4,007,127
DATED : February 8, 1977
INVENTOR(S) : RENE SMADJA and LOUIS HOUIZOT It is certified that error appears in the above-identified patent and that said Letters Patent are hereby corrected as shown below:

Column 8, line 36      "triamine is diethylene polyamine" should be --polyamine is diethylene triamine--.

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*